United States Patent
Huang et al.

(10) Patent No.: US 12,248,353 B1
(45) Date of Patent: Mar. 11, 2025

(54) METHOD OF PERFORMING POWER SAVING CONTROL ON DISPLAY DEVICE AND RELATED DISPLAY DEVICE

(71) Applicant: HIMAX TECHNOLOGIES LIMITED, Tainan (TW)

(72) Inventors: Hung-Yu Huang, Tainan (TW); Shu-Ming Chang, Tainan (TW); Chia-Hui Wang, Tainan (TW); Shiang-Wei Wang, Tainan (TW); Sheng-Wen Huang, Tainan (TW); Tsung-Yi Tsai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 57 days.

(21) Appl. No.: 18/243,659

(22) Filed: Sep. 7, 2023

(51) Int. Cl.
| | |
|---|---|
| *G06F 1/26* | (2006.01) |
| *G06F 1/3218* | (2019.01) |
| *G06F 1/3234* | (2019.01) |
| *G06F 1/3287* | (2019.01) |
| *G06F 1/3203* | (2019.01) |

(52) U.S. Cl.
CPC .......... *G06F 1/3265* (2013.01); *G06F 1/3218* (2013.01); *G06F 1/3287* (2013.01); *G06F 1/3203* (2013.01)

(58) Field of Classification Search
CPC ..... G06F 1/3265; G06F 1/3218; G06F 1/3287
USPC ....................................................... 713/320
See application file for complete search history.

(56) References Cited

U.S. PATENT DOCUMENTS

| | | | |
|---|---|---|---|
| 11,775,117 B1* | 10/2023 | Wen ...... | G09G 3/3225 345/173 |
| 2009/0295762 A1* | 12/2009 | Fan ...... | G09G 3/3611 345/204 |
| 2010/0289945 A1* | 11/2010 | Kobayashi ........ | G06F 1/3218 348/E3.047 |
| 2018/0040286 A1* | 2/2018 | Huang ...... | G09G 3/3611 |
| 2018/0350313 A1* | 12/2018 | Nambi ...... | G09G 3/36 |
| 2019/0172427 A1* | 6/2019 | Saini ...... | G09G 5/18 |
| 2020/0327862 A1* | 10/2020 | Sinha ...... | G09G 5/003 |
| 2021/0407467 A1* | 12/2021 | Koo ...... | G06F 3/0412 |
| 2022/0051599 A1* | 2/2022 | Kang ...... | G09G 3/20 |
| 2022/0223093 A1* | 7/2022 | Tian ...... | G09G 3/3208 |
| 2022/0351679 A1* | 11/2022 | Yang ...... | G09G 3/3225 |
| 2023/0134189 A1* | 5/2023 | Xu ...... | A63F 13/25 463/31 |
| 2023/0197013 A1* | 6/2023 | Yoon ...... | G09G 3/3266 345/204 |
| 2024/0397106 A1* | 11/2024 | Naser ...... | H04N 19/70 |

* cited by examiner

*Primary Examiner* — Volvick Derose
(74) *Attorney, Agent, or Firm* — Winston Hsu (57) ABSTRACT

A method of performing power saving control on a display device includes: generating, by a timing controller of the display device, a power saving start indication and a power saving end indication in response to changing of a refresh rate of the display device; receiving, by a source driver of the display device, the power saving start indication and the power saving end indication; in response to the power saving start indication, allowing a part of circuitry of the source driver to be powered down during a vertical blanking interval; and in response to the power saving end indication, allowing the powered down part of circuitry of the source driver to be woken up during the vertical blanking interval.

20 Claims, 7 Drawing Sheets

METHOD OF PERFORMING POWER SAVING CONTROL ON DISPLAY DEVICE AND RELATED DISPLAY DEVICE

BACKGROUND OF THE INVENTION

1. Field of the Invention

The present invention relates to display device, and more particularly, to a method of performing power saving control on a display device and related display device.

2. Description of the Prior Art

Variable Refresh Rate (VRR) technology dynamically tailors a refresh rate of a display device to match display content being shown. This means that when the display content changes significantly, such as in the fast-paced action of video games, the refresh rate can increase, leading to a smoother visual experience. Conversely, when the display content remains relatively static, the refresh rate can decrease, helping conserve energy. This adaptability significantly enhances performance and efficiency of the display device, making it more versatile in handling diverse content. On the other hand, a vertical blanking interval represents a pause between successive frames during which the display device refrains from image updates. This period allows the display device to process and prepare image data for a forthcoming frame. In the realm of VRR, a length of the vertical blanking interval can be adjusted to accommodate varying refresh rates. However, when the refresh rate is reduced, the vertical blanking interval consequently lengthens. This extended interval could potentially waste energy, as the display device remains active but not productive. Hence, there emerges a necessity for an energy-efficient control mechanism on the display device that optimally manages the lengthened vertical blanking interval.

SUMMARY OF THE INVENTION

With this in mind, it is one object of the present invention to provide a method of performing power saving control on a display device. Embodiments of the present invention allow one or more specific parts of a source driver of the display device to switch into a power saving mode during the vertical blanking interval. This transition is triggered by a power saving start indication and concludes with a power saving end indication, both of which are generated by a timing controller of the display device. In view of this, the present invention optimally balances performance and energy consumption of the display device.

According to one embodiment, a method of performing power saving control on a display device is provided. The method comprises: generating, by a timing controller of the display device, a power saving start indication and a power saving end indication in response to changing of a refresh rate of the display device; receiving, by a source driver of the display device, the power saving start indication and the power saving end indication; in response to the power saving start indication, allowing a part of circuitry of the source driver to be powered down during a vertical blanking interval; and in response to the power saving end indication, allowing the powered down part of circuitry of the source driver to be woken up during the vertical blanking interval.

According to one embodiment, a display device is provided. The display device comprises: a timing controller and a source driver. The timing controller is configured to generate a power saving start indication and a power saving end indication in response to changing of a refresh rate of the display device. The source driver is configured to receive the power saving start indication and the power saving end indication. The source driver is further configured to power down a part of circuitry in response to the power saving start indication and wake up the powered down part of circuitry in response to the power saving end indication during the vertical blanking interval.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
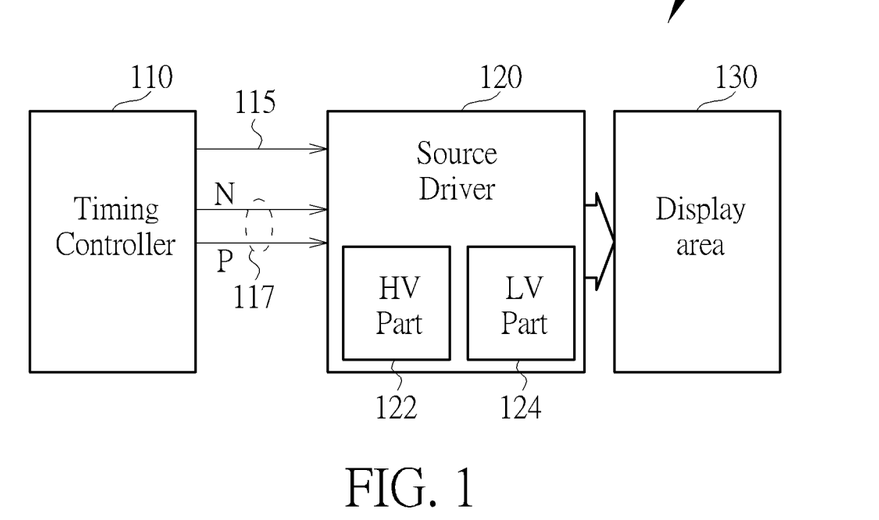
FIG. 1 illustrates a display device including a timing controller and a source driver according to one embodiment of the present invention.

FIG. 1 illustrates a timing controller and a source driver of a display device according to one embodiment of the present invention. As illustrated, a display device 10 includes a timing controller 110, a source driver 120 and a display area 130. Typically, the timing controller 110 serves as an intermediary between a video processing unit (not shown), which generates image data, and the source driver 120, which drives physical pixels on the display area 130. The main function of the timing controller 110 is to coordinate a flow of image data from the video processing unit to the source driver 120. The timing controller 110 does this by generating various timing signals that control when and how the image data should be transferred. These signals align with a refresh rate of the display device 10 and ensure that the image data is delivered to the source driver 120 at the correct time for each frame. The source driver 120, on the other hand, is responsible for converting the image data received from the timing controller 110 into analog signals. Accordingly, the source driver 120 drives the physical pixels on the display area 130. In short, the timing controller 110 and the source driver 120 work together to ensure that the image data generated by the video processing unit can be accurately and efficiently displayed on the display area 130.

Figure 2:
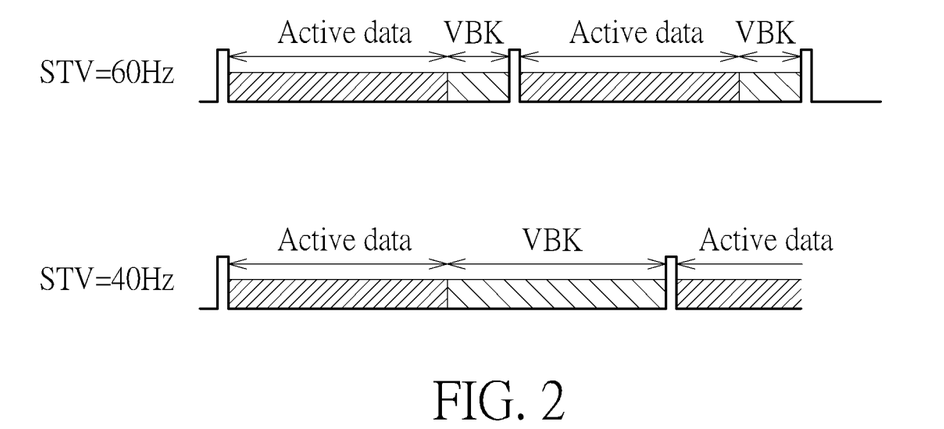
FIG. 2 illustrates relationship between active data interval and vertical blanking interval.

Please refer to FIG. 2, which illustrates relationship between active data interval and vertical blanking interval according to one embodiment of the present invention. Typically, each frame interval starts with a pulse of a STV signal (e.g. V-sync) and includes an active data interval and a vertical blanking interval (VBK). The active data interval is a period during which video signals containing actual image information are transmitted from the video processing unit to the source driver 120. During the active data interval, the timing controller 110 generates various timing signals, which control when and how the image data is transferred. These signals ensure that the image data is delivered to the source driver 120 at the correct time, corresponding to each physical pixel on the display area 130. During the active data interval, the source driver 120 receives the image data from the timing controller 110 and converts the image data into analog signals. These analog signals, corresponding to brightness and color information for each physical pixel, are then used to drive the physical pixels on the display area 130.

During the vertical blanking interval, the timing controller 110 will cease to send active pixel information (e.g. brightness and color information) to the source driver 120. However, the timing controller 110 may send certain control commands or metadata during this time, such as instructions for frame synchronization, to the source driver 120. During the vertical blanking interval, the source driver 120 will also cease to receive active pixel information. As depicted in FIG. 2, when the refresh rate changes from the 60 Hz to 40 Hz, the vertical blanking interval is significantly lengthened.

In view of this, the present invention allows the source driver 120 to power down parts of its circuitry that are not in use, reducing overall power consumption of the display device 10 when the refresh rate is changed to a lower value. In one embodiment, the source driver 120 comprises a high-voltage (HV) part 122 and a low-voltage (LV) part 124. Typically, the LV part 124 includes those components and circuits that are responsible for receiving and processing signals from the timing controller 110. On the other hand, the HV part 122 includes those components and circuits that are responsible for driving physical pixels of the display area 130. According to various embodiments of the present invention, both of the LV part 124 and the HV part 122 of the source driver 130 can be selectively powered down during the vertical blanking interval. In one embodiment, not all of the HV part 122 can be powered down in response to a lower refresh rate. For example, CHOP circuit, CHOP bias circuit, ROP circuit, and ROP bias circuit that belong to the HV part 122 of the source driver 120 can be powered down in response to a lower refresh rate. However, POFR circuit and HV bandgap circuit that belong to the HV part 122 of the source driver 120 are not allowed to be powered in response to a lower refresh rate. In one embodiment, not all of the LV part 124 can be powered down in response to a lower refresh rate. For example, clock data recovery (CDR) circuit and receiver circuit that belong to the LV part 124 of the source driver 120 can be powered down in response to a lower refresh rate. However, POFR circuit and LV bandgap circuit that belong to the LV part 124 of the source driver 120 are not allowed to be powered in response to a lower refresh rate.

A power saving event is initiated by the timing controller 110 in response to changes in the refresh rate. Accordingly, based on the onset of the vertical blanking interval, the timing controller 110 is configured to generate a power saving start indication to indicate the source driver to switch to a power saving state. Based on the end of the vertical blanking interval, the timing controller 110 is configured to generate a power saving end indication to indicate the source driver to terminate the power saving state.

Figure 3:
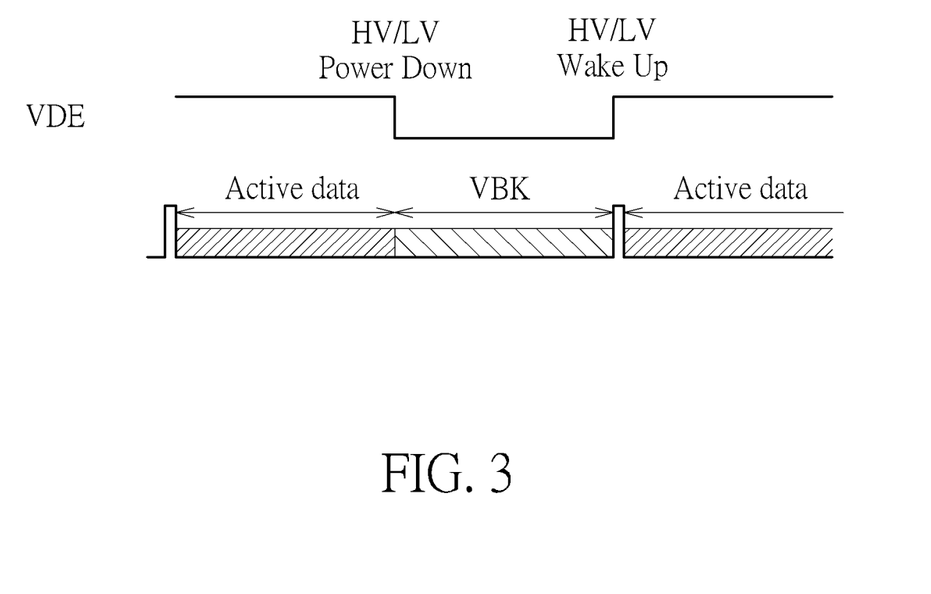
FIG. 3 illustrates a power saving control mechanism according to a first embodiment of the present invention.

FIG. 3 illustrates a power saving control mechanism according to a first embodiment of the present invention. In this embodiment, the timing controller 110 is configured to inform the source driver 120 about a power saving event (i.e., switching to or terminating the power saving state) through a power saving signal VDE. The power saving signal VDE is transmitted through on a dedicated hardware pin 115 that links the timing controller 110 and the source driver 120, which ensures a direct and efficient communication pathway between the timing controller 110 and the source driver 120. As depicted in FIG. 3, around the onset of the vertical blanking interval, the power saving signal VDE is de-asserted by the timing controller 120, which serves as a power saving start indication (indicating to initiate a power saving state). In response to the power saving start indication, the source driver 120 is configured to power down either or both the LV part 124 and the HV part 122. On the other hand, toward the end of the vertical blanking interval, the power saving signal VDE is asserted by the timing controller 120, which serves as a power saving end indication (indicating to terminate the power saving state). In response to the power saving end indication, the source driver 120 is configured to wake up (i.e., reactivate) the LV part 124 and/or the HV part 122, which has been powered down during the earlier power saving state.

Figure 4:
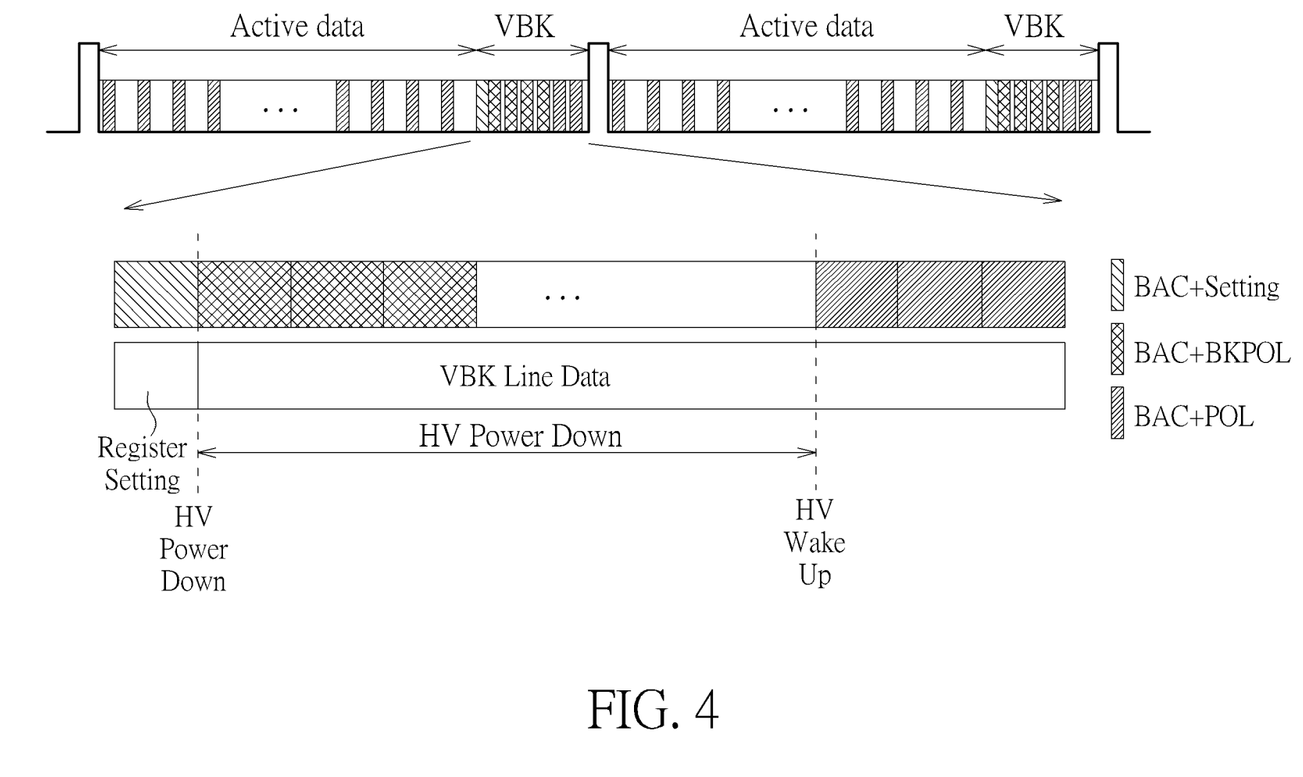
FIG. 4 illustrates a power saving control mechanism according to a second embodiment of the present invention.

FIG. 4 illustrates a power saving control mechanism according to a second embodiment of the present invention. In this embodiment, the timing controller 110 is configured to inform the source driver 120 about a power saving event through distinct command types. At first, the timing controller 110 send a register setting command via a data channel 117 to the source driver 120, which serves as a power saving start indication (indicating to initiate a power saving state). Assuming that the communication between the timing controller 110 and the source driver 120 is facilitated via the Integrated-Stream Protocol (iSP), the register setting command may comprise a combination of a "BAC" command and a "Setting" command that are defined in the iSP. Subsequently, the timing controller 110 sends a horizontal line start command through the data channel 117 to the source driver 120, which serves as a power saving end indication (indicating to terminate the power saving state). Under the assumption of communication based on the iSP, the horizontal line start command may comprise a combination of the "BAC" command and a "POL" command that are defined in the iSP.

As depicted in FIG. 4, the timing controller 110 sends the combination of the "BAC" command and the "POL" command prior to sending active data for each horizontal pixel line data of the display area 130 during the active data interval. Following the end of the active data interval and the onset of vertical blanking interval, the timing controller 110 sends the combination of the "BAC" command and the "Setting" command as the power saving start indication, thereby to signify the initiation of the power saving state. In response to the combination of the "BAC" command and the "Setting" command, the source driver 120 is configured to power down the HV part 124. Throughout the vertical blanking interval, the timing controller 110 sends the combination of the "BAC" command and a "BKPOL" to the source driver 120. As a forthcoming frame approaches, the timing controller 110 is configured to terminate the power saving state. Accordingly, the timing controller 110 sends the combination of the "BAC" command and the "POL" command around the end of the vertical blanking interval as the power saving end indication (indicating to terminate the power saving state) to the source driver 120. In response to the combination of the "BAC" command and the "POL" command received during the vertical blanking interval, the source driver 120 is configured to wake up (i.e., reactivate) the HV part 124, which has been powered down during the earlier power saving state. In addition, according to various embodiments of the present invention, the timing controller 110 could send a register setting command to the source driver 120 as the power saving start indication, while send a dummy vertical blanking line data to the source driver 120 as the power saving end indication.

Figure 5:
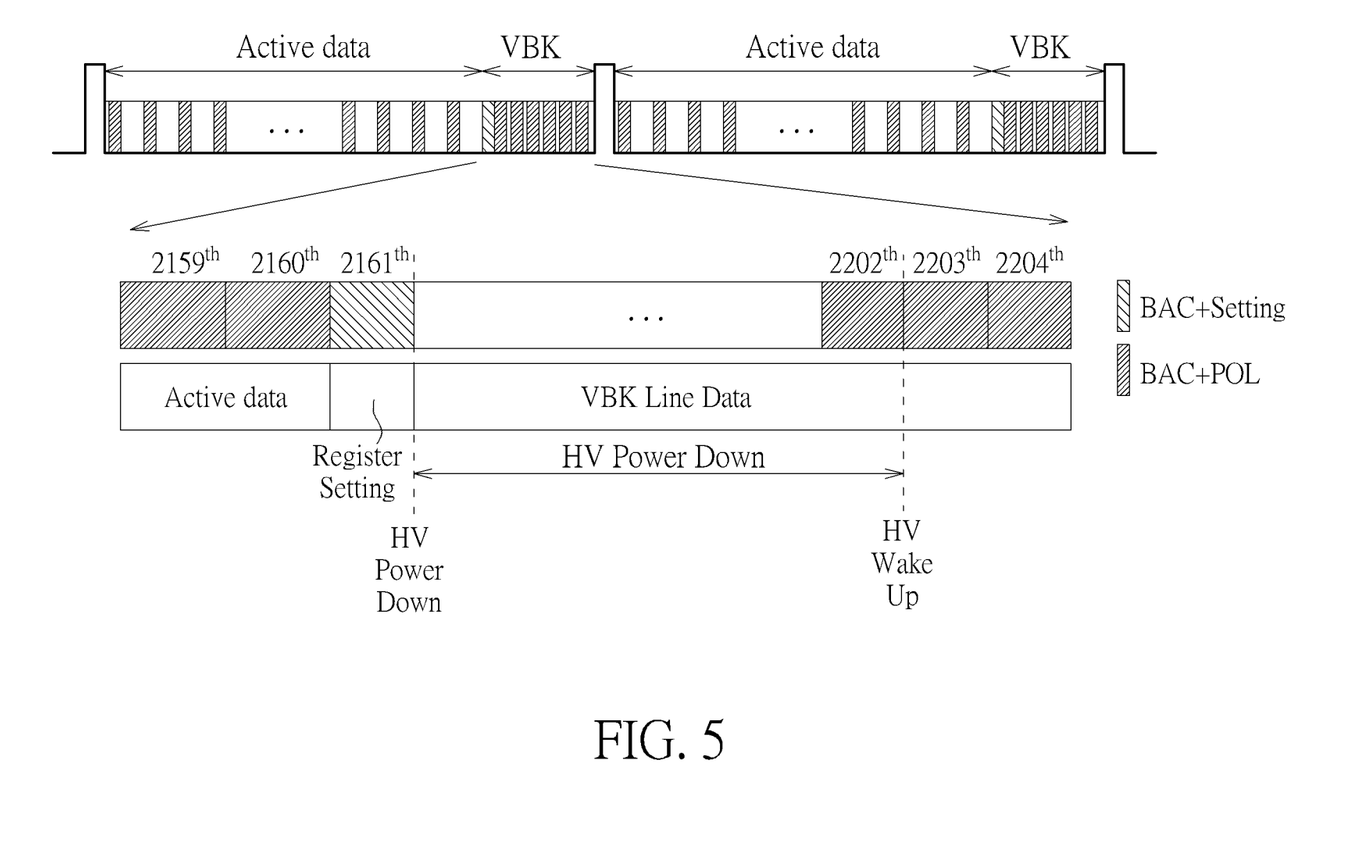
FIG. 5 illustrates a power saving control mechanism according to a third embodiment of the present invention.

FIG. 5 illustrates a power saving control mechanism according to a third embodiment of the present invention. In this embodiment, the timing controller 110 is configured to use a specific number of commands to inform the source driver 120 about a power saving event. It works by issuing a sequence of line commands through data channel 117. The power saving start indication can be signified by a first count of line commands, while the power saving end indication can be signified by a second count of line commands. Assuming that the communication between the timing controller 110 and the source driver 120 is based on the iSP, the line command could be a combination of the "BAC" command and the "Setting" command, as well as a combination of the "BAC" and "POL" commands as defined in the iSP.

As depicted in FIG. 5, for the display area 130 having a resolution of 3840×2160, the timing controller 110 is configured to send 2160 combinations of the "BAC" command and the "POL" command during the active data interval, each associated with active data for a single horizontal pixel line of the display area 130. During the active data interval, the timing controller 110 sends 2160 line commands. Following the end of the active data interval and the onset of vertical blanking interval, the timing controller 110 sends the combination of the "BAC" command and the "Setting" command to the source driver 120, serving as the power saving start indication (indicating to initiate the power saving state). The combination of the "BAC" command and the "Setting" command is also the "2161th" line command.

On the other hand, the source driver 120 comprises a counter for counting the number of received line commands (i.e., the combination of the "BAC" command and the "Setting" command, as well, as the combination of the "BAC" command and the "POL" command) during a frame interval. In response to the "2161$^{th}$" line command, the source driver 120 is configured to power down the HV part 124. Subsequently, the timing controller 110 continues to send line command (i.e., the combination of the "BAC" command and the "POL" command) to the source driver 120. Throughout the vertical blanking interval, the timing controller 110 keeps sending the line commands to the source driver 120. Once the counter of the source driver 120 indicates that the "2202$^{th}$" line commands has been received, the source driver 120 is configured to wake up (i.e., reactivate) the HV part 124 that was previously powered down. Please note that the specific numbers (e.g. "2161$^{th}$" and "2202$^{th}$") mentioned in the above description are provided for illustrative purposes and should not be considered as limitations of the present invention. According to various embodiments of the present invention, the source driver 120 may power down/wake up the HV part 124 in response to different counts of line commands. In addition, according to various embodiments of the present invention, the timing controller 110 could send a register setting command to the source driver 120 as the power saving start indication, while send a specific count of dummy vertical blanking line data to the source driver 120 as the power saving end indication.

Figure 6:
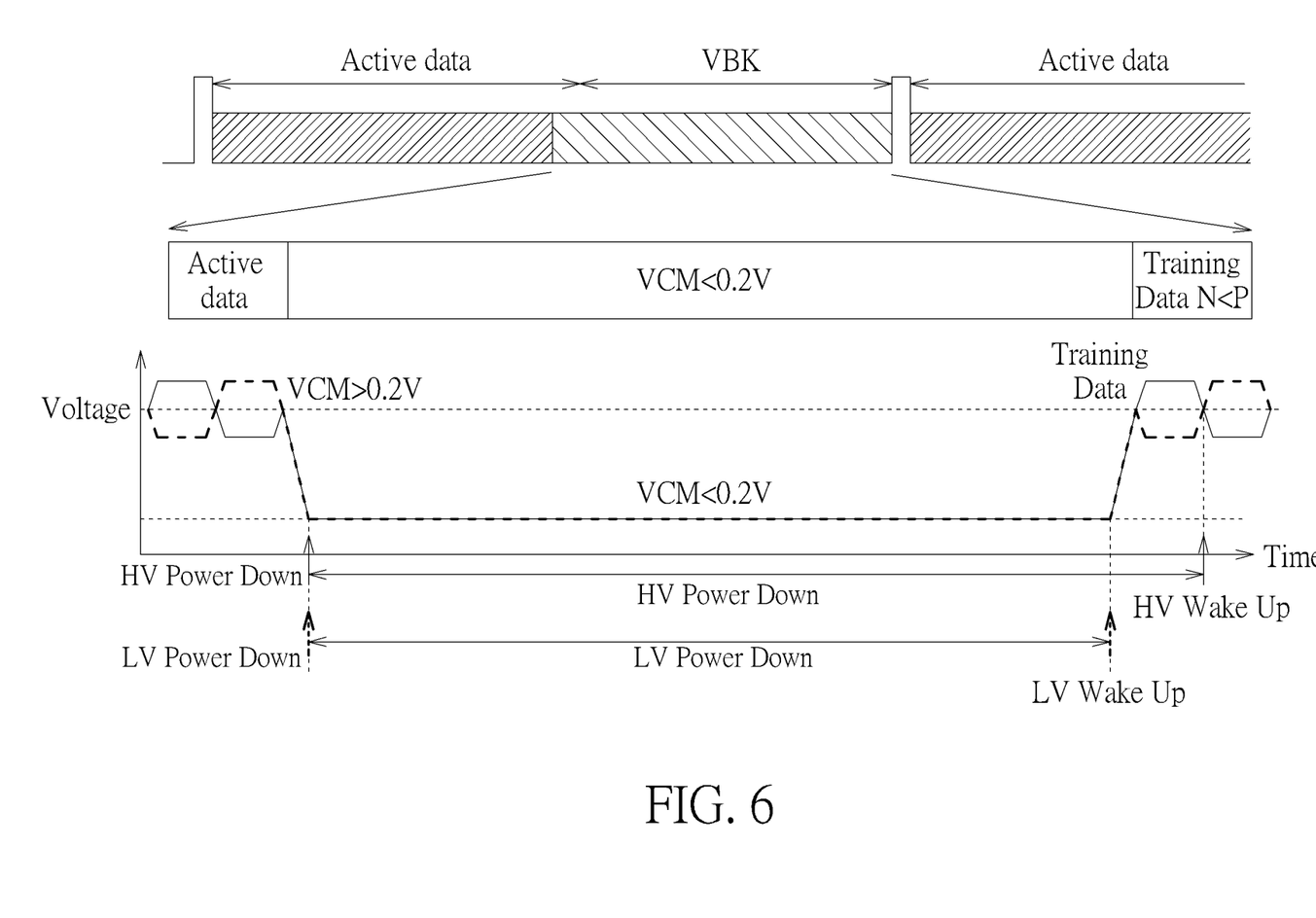
FIG. 6 illustrates a power saving control mechanism according to a fourth embodiment of the present invention.

FIG. 6 illustrates a power saving control mechanism according to a fourth embodiment of the present invention. In this embodiment, the timing controller 110 is configured to inform the source driver 120 about a power saving event through changes in a common mode voltage on the data channel 117. As depicted in FIG. 6, around the onset of the vertical blanking interval, the timing controller 110 adjusts the common mode voltage VCM on the data channel 117, reducing it to below 0.2V, which serves as a power saving start indication (indicating to initiate the power saving state). In response to the power saving start indication, the source driver 120 is configured to power down either or both the LV part 124 and the HV part 122. On the other hand, toward the end of the vertical blanking interval, the timing controller 110 is configured to increase the common mode voltage VCM on the data channel 117 to exceed 0.2V, which serves as a LV power saving end indication (indicating to terminate the power saving state for LV part 124). In response to the LV power saving end indication, the source driver 120 is configured to wake up (i.e., reactivate) a powered-down clock data recovery (CDR) circuit and/or a powered-down receiver circuit in LV part 124. After the timing controller 110 has increased the common mode voltage VCM on the data channel 117 to exceed 0.2V, the timing controller 110 is configured to transmit to training data to the source driver 120 around the end of the vertical blanking interval. According to the training data transmitted from the timing controller 110, the woken-up CDR circuit and/or the woken-up receiver circuit of the source driver 120 is configured to lock an operating clock of the timing controller 110 through CDR mechanism. After that, the source driver 120 can be in synchronization with the timing controller 110.

In addition, the source driver 120 is configured to wake up (i.e., reactivate) the powered-down HV part 122 after the source driver 120 locks the operating clock of the timing controller 110. That is, the power saving end indication is based on a frequency lock state of the source driver 120. Once the source driver 120 and the timing controller 110 are locked in the operating clock, the source driver 120 can detect a voltage level on a negative signal line (N) of the data channel 117 is lower than a voltage level on a positive signal line (P) of the data channel 117.

Figure 7:
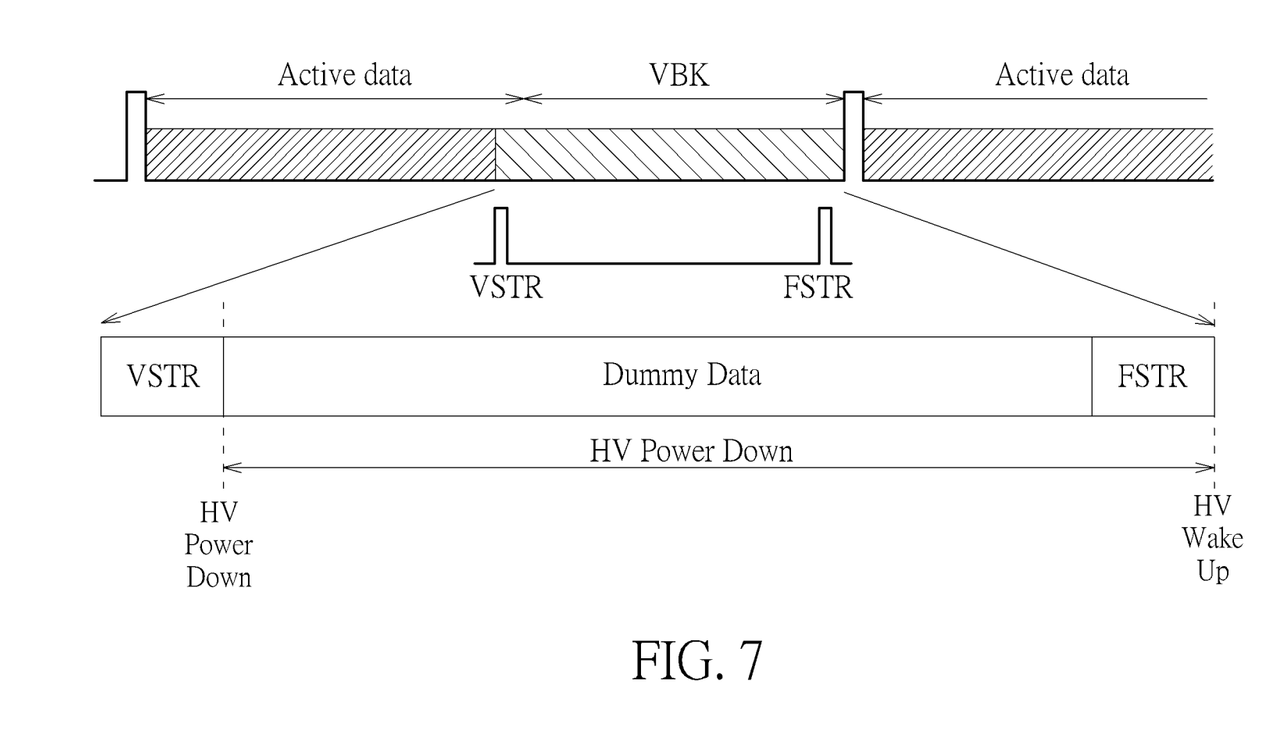
FIG. 7 illustrates a power saving control mechanism according to a fifth embodiment of the present invention.

FIG. 7 illustrates a power saving control mechanism according to a fifth embodiment of the present invention. In this embodiment, the timing controller 110 is configured to inform the source driver 120 about a power saving event through distinct line configuration commands. As depicted in FIG. 7, around the onset of the vertical blanking interval, the timing controller 110 sends a vertical blanking start command through the data channel 117 to the source driver 120, which serves as a power saving start indication (indicating to initiate a power saving state). Assuming that the communication between the timing controller 110 and the source driver 120 is facilitated via Unified Standard Interface for TV (USI-T) protocol, the vertical blanking start command could be a "VSTR" command that is defined by USI-T protocol. In response to the "VSTR" command, the source driver 120 is configured to power down the HV part 124. On the other hand, toward the end of the vertical blanking interval, the timing controller 110 sends a frame start command through the data channel 117 to the source driver 120, which serves as the power saving end indication (indicating to terminate the power saving state). Under the assumption of communication based on the USI-T protocol, the frame start command could be a "FSTR" command that is defined in USI-T protocol. In response to the "FSTR" command, the source driver 120 is configured to wake up (i.e., reactivate) the HV part 124 that was previously powered down.

Figure 8:
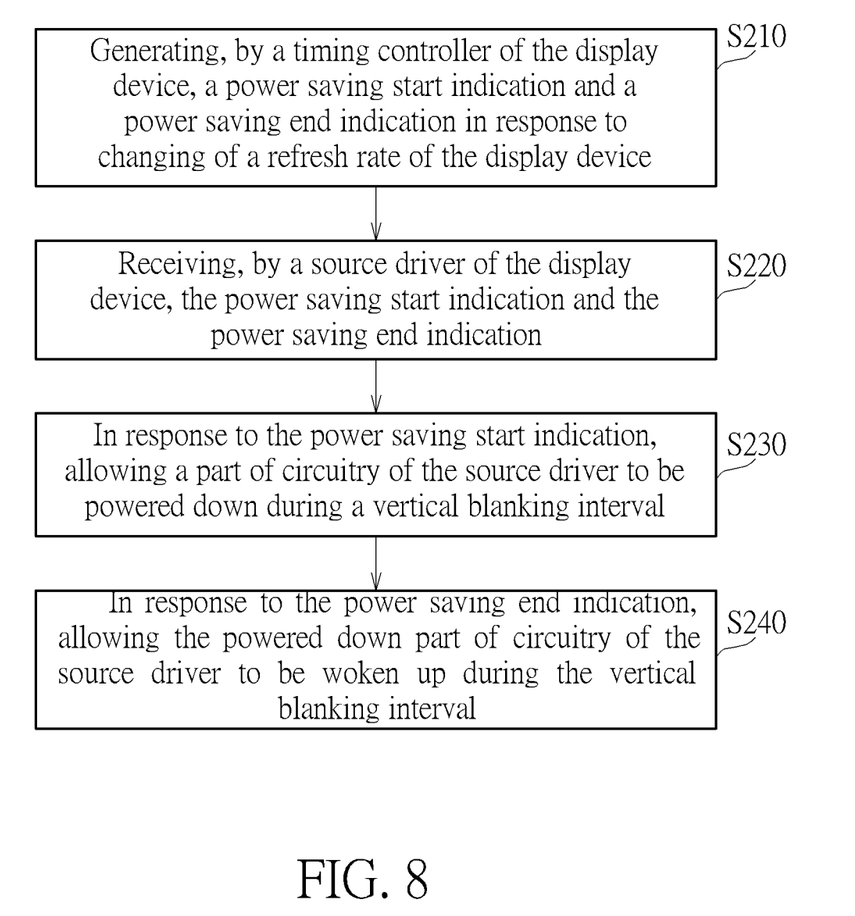
FIG. 8 illustrates a flow chart of a method of performing power saving control on a display device according to one embodiment of the present invention.

FIG. 8 illustrates a flow chart of a method of performing power saving control on a display device according to one embodiment of the present invention. As shown in the figure, the method of the present invention includes the following simplified flow:

Step S210: generating, by a timing controller of the display device, a power saving start indication and a power saving end indication in response to changing of a refresh rate of the display device;

Step S220: receiving, by a source driver of the display device, the power saving start indication and the power saving end indication;

Step S230: in response to the power saving start indication, allowing a part of circuitry of the source driver to be powered down during a vertical blanking interval; and Step S240: in response to the power saving end indication, allowing the powered down part of circuitry of the source driver to be woken up during the vertical blanking interval.

In conclusion, the present invention provides a power saving control mechanism to lower power consumption of a source driver of a display device in response to a low refresh rate of the display device.

Since the principles and specific details of the foregoing steps have been explained in detail through the above embodiments, further descriptions will not be repeated here. It should be noted that the above flow can be enhanced by adding other extra steps or making appropriate modifications and adjustments, to improve performance and further enhance the energy-efficiency of the display device 10.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing power saving control on a display device, comprising:

generating, by a timing controller of the display device, a power saving start indication and a power saving end indication in response to changing of a refresh rate of the display device;

receiving, by a source driver of the display device, the power saving start indication and the power saving end indication;

in response to the power saving start indication, allowing a part of circuitry of the source driver to be powered down during a vertical blanking interval; and in response to the power saving end indication, allowing the powered down part of circuitry of the source driver to be woken up during the vertical blanking interval.

2. The method of claim 1, wherein the step of allowing the part circuitry of the source driver to be powered down comprises:

allowing a high voltage (HV) part and/or a low voltage part (LV) of the circuitry of the source driver in response to the power saving start indication; and the step of allowing the part circuitry of the source driver to be woken up comprises:

allowing the powered down HV part and/or the powered down LV part of the circuitry of the source driver to be woken up in response to the power saving end indication.

3. The method of claim 1, wherein the step of generating the power saving start indication and the power saving end indication comprises:

generating the power saving start indication by de-asserting a power saving signal on a dedicated pin between the timing controller and the source driver; and generating the power saving end indication by asserting the power saving signal on the dedicated pin between the timing controller and the source driver.

4. The method of claim 1, wherein the step of generating the power saving start indication and the power saving end indication comprises:
generating the power saving start indication by sending a register setting command from the timing controller to the source driver; and
generating the power saving end indication by sending a horizontal line start command from the timing controller to the source driver.

5. The method of claim 4, wherein the register setting command is a combination of a BAC command and a Setting command that are defined by Integrated-Stream Protocol; and the horizontal line start command is a combination of the BAC command and a POL command that are defined by Integrated-Stream Protocol.

6. The method of claim 1, wherein the step of generating the power saving start indication and the power saving end indication comprises:
generating the power saving start indication and the power saving end indication by sending a specific count of line commands to the source driver during the vertical blanking interval.

7. The method of claim 6, wherein the horizontal line start command is a combination of BAC command and a Setting command that are defined by Integrated-Stream Protocol, as well as a combination of BAC command and a POL command that are defined by Integrated-Stream Protocol.

8. The method of claim 1, wherein the step of generating the power saving start indication and the power saving end indication comprises:
generating the power saving start indication and the power saving end indication by adjusting a common mode voltage on a data channel between the timing controller and the source driver.

9. The method of claim 8, wherein the step of adjusting the common mode voltage on the data channel between the timing controller and the source driver comprises:
generating the power saving start indication by reducing the common mode voltage on the data channel to a level below a predetermined threshold; and
generating the power saving end indication according to a frequency lock state of the source driver.

10. The method of claim 1, wherein the step of generating the power saving start indication and the power saving end indication comprises:
generating the power saving start indication by sending a vertical blanking start command from the timing controller to the source driver; and
generating the power saving start indication by sending a frame start command from the timing controller to the source driver.

11. A display device, comprising:
a timing controller, configured to generate a power saving start indication and a power saving end indication in response to changing of a refresh rate of the display device; and
a source driver, configured to receive the power saving start indication and the power saving end indication, power down a part of circuitry in response to the power saving start indication and wake up the powered down part of circuitry in response to the power saving end indication during the vertical blanking interval.

12. The display device of claim 11, wherein the source driver is configured to power down a high voltage (HV) part and/or a low voltage part (LV) of the circuitry of the source driver in response to the power saving start indication, and the source driver is configured to wake up the powered down HV part and/or the powered down LV part of the circuitry of the source driver in response to the power saving end indication.

13. The display device of claim 11, wherein the timing controller is configured to:
generate the power saving start indication by de-asserting a power saving signal on a dedicated pin between the timing controller and the source driver; and
generate the power saving end indication by asserting the power saving signal on the dedicated pin between the timing controller and the source driver.

14. The display device of claim 11, wherein the timing controller is configured to:
generate the power saving start indication by sending a register setting command to the source driver; and
generating the power saving end indication by sending a horizontal line start command to the source driver.

15. The display device of claim 14, wherein the register setting command is a combination of a BAC command and a Setting command that are defined by Integrated-Stream Protocol; and the horizontal line start command is a combination of the BAC command and a POL command that are defined by Integrated-Stream Protocol.

16. The display device of claim 11, wherein the timing controller is configured to:
generate the power saving start indication and the power saving end indication by sending a specific count of line commands to the source driver during the vertical blanking interval.

17. The display device of claim 16, wherein the horizontal line start command is a combination of BAC command and a Setting command that are defined by Integrated-Stream Protocol, as well as a combination of a BAC command and a POL command that are defined by Integrated-Stream Protocol.

18. The display device of claim 11, wherein the timing controller is configured to:
generate the power saving start indication and the power saving end indication by adjusting a common mode voltage on a data channel between the timing controller and the source driver.

19. The display device of claim 18, wherein the timing controller is configured to:
generate the power saving start indication by reducing the common mode voltage on the data channel to a level below a predetermined threshold; and
generate the power saving end indication according to a frequency lock state of the source driver.

20. The display device of claim 11, wherein the timing controller is configured to:
generate the power saving start indication by sending a vertical blanking start command to the source driver; and
generate the power saving start indication by sending a frame start command to the source driver.

* * * * *